United States Patent
Ahmad

(10) Patent No.: US 10,343,650 B1
(45) Date of Patent: Jul. 9, 2019

(54) NFC SYSTEM FOR UNLOCKING A VEHICLE VIA SMARTPHONE BIOMETRIC AUTHENTICATION

(71) Applicant: Omar Mustafa Kamal Ahmad, Slidell, LA (US)

(72) Inventor: Omar Mustafa Kamal Ahmad, Slidell, LA (US)

( * ) Notice: Subject to any disclaimer, the term of this patent is extended or adjusted under 35 U.S.C. 154(b) by 0 days.

(21) Appl. No.: 15/940,311

(22) Filed: Mar. 29, 2018

(51) Int. Cl.
*B60R 25/24* (2013.01)
*G07C 9/00* (2006.01)
*H04W 4/80* (2018.01)
*B60R 25/25* (2013.01)

(52) U.S. Cl.
CPC ............ *B60R 25/24* (2013.01); *B60R 25/252* (2013.01); *G07C 9/00309* (2013.01); *H04W 4/80* (2018.02); *B60R 2325/103* (2013.01); *B60R 2325/205* (2013.01)

(58) Field of Classification Search
CPC ........ B60R 25/24; B60R 25/252; H04W 4/80; G07C 9/00309
See application file for complete search history.

(56) References Cited

U.S. PATENT DOCUMENTS

| | | |
|---|---|---|
| 6,140,939 A | 10/2000 | Flick |
| 6,819,219 B1 | 11/2004 | Bolle et al. |
| 6,992,562 B2 | 1/2006 | Fuks et al. |
| 7,185,198 B2 | 2/2007 | Nakamura et al. |
| 8,768,565 B2 | 7/2014 | Jefferies et al. |
| 9,483,886 B2 | 11/2016 | Bergerhoff et al. |
| 9,508,204 B2 | 11/2016 | Oz et al. |
| 9,530,265 B2 | 12/2016 | Lee et al. |
| 9,685,012 B2 | 6/2017 | Saeedi et al. |
| 9,751,497 B2 | 9/2017 | Sanji et al. |
| 9,852,563 B2 | 12/2017 | Bergerhoff et al. |
| 2006/0097844 A1 | 5/2006 | Nakashima et al. |
| 2007/0197261 A1 | 8/2007 | Humbel |

(Continued)

FOREIGN PATENT DOCUMENTS

| CN | 103035054 A | 4/2013 |
|---|---|---|
| CN | 103295395 A | 9/2013 |

(Continued)

*Primary Examiner* — Leon Flores
(74) *Attorney, Agent, or Firm* — Norton IP Law Firm; Taylor M. Norton

(57) ABSTRACT

The present disclosure provides for a novel method and apparatus for automatically unlocking a vehicle, comprising installing a biometric authentication module located within a door of the vehicle. The authentication module comprises a microcontroller board with NFC capabilities and a relay shield configured to send a signal to a central locking system of the vehicle. The authentication module is adapted to wirelessly connect to a personal data device ("PDD") that is configured for biometric authentication of a user of the device. When a PDD is placed within NFC communication range of the microcontroller board, the PDD automatically prompts an authentication mechanism to the verify the identity of a user when the PDD is in NFC communication with the authentication module. Upon verifying the identity of the user via biometric authentication while in NFC communication with the PDD, the module automatically sends a signal to unlock the vehicle.

60 Claims, 15 Drawing Sheets

(56) References Cited

U.S. PATENT DOCUMENTS

| | | | |
|---|---|---|---|
| 2014/0114504 A1* | 4/2014 | Yamashita | B60R 25/40 |
| | | | 701/2 |
| 2014/0292479 A1 | 10/2014 | Ruckart | |
| 2016/0055695 A1 | 2/2016 | Saeedi et al. | |
| 2017/0337834 A1* | 11/2017 | Shindi | G09B 5/02 |
| 2018/0178759 A1* | 6/2018 | Santavicca | B60R 25/25 |
| 2018/0201225 A1* | 7/2018 | Farges | G06F 21/32 |

FOREIGN PATENT DOCUMENTS

| | | |
|---|---|---|
| CN | 104709237 A | 6/2015 |
| WO | WO2012061609 A1 | 5/2012 |
| WO | WO2017137549 A1 | 8/2017 |

\* cited by examiner

NFC SYSTEM FOR UNLOCKING A VEHICLE VIA SMARTPHONE BIOMETRIC AUTHENTICATION

BACKGROUND OF THE INVENTION

Field of the Invention

The present invention pertains to a system for using an NFC enabled smartphone's biometric authentication to trigger sending via NFC a signal to a receiver module in an automotive door in order to control the car's central locking system, to lock and unlock the doors. The present invention further pertains to a system to use pre-existing infrastructure existing in automobiles, such as the central locking system, key fob, and/or the OBD-II port, and smartphones, specifically the NFC frequency and biometric sensors, to allow for quick and secure control over the car's central locking system, to lock and unlock the doors.

Description of the Related Art

Automating the vehicle rental process has been a goal of the rental car industry for years. Using biometrics obtained via a customer's smartphone or other wireless accessories can create a secure, efficient, and automated method of renting a car without the need to interact with a customer service representative. Automating the communication between a person and a car has been a neglected domain for years. In the past decade, auto manufacturers have integrated keyless access systems to establish the convenience of automatic unlocking without having to reach for keys. Furthermore, rental car companies do not have an on-demand access control for their large fleets to protect from unauthorized drivers. Technology companies have developed faster and more secure frequencies to use in different applications, such as payment processing. It is the goal of the present invention to use preexisting infrastructure and minimal components to establish a new way to unlock and lock cars while keeping with the function of a car key—to protect the safety of a car by quickly unlocking and locking the doors by authorized users only. By using biometrics obtained via a customer's smartphone or other wireless accessories, this will create a secure, efficient, and automated method of unlocking a car.

Chinese Patent CN103035054A discloses using NFC technology to unlock and lock car doors. The mechanism will be validated by the rental car company's fleet management department to authorize such requests. They note an advantage which is connecting the NFC module to the car's central locking system directly.

Chinese Patent CN104709237A discloses an unlocking and locking an automobile door with a mobile device but does specify NFC connectivity as used in the present invention.

Chinese Patent CN103295395A discloses using Bluetooth connectivity to unlock and lock rental cars.

U.S. Pat. No. 8,768,565B2 discloses a mobile device to unlock/lock a car within a rental fleet and ultimately eliminate the need for a customer service representative. These systems utilize QR codes/barcodes and do not mention the use NFC as the sole method. QR codes/barcodes are inconvenient because it's a secondary step that NFC can eliminate. This system depends on the OBD reader to communicate with the car, but this can be unreliable as a user can easily remove this or the connection can deteriorate and therefore ruin the entire model of unlocking/locking a car door with NFC. The connection should be made inaccessible by the user (i.e., built in the driver side door, built into the central locking system) to avoid any risk. The car key is to be removed from a lockbox after approval from cloud.

U.S. Patent Application Publication 2007/0197261A1 discloses using a smartphone's connection (from NFC to GSM) to be an "all-in-one" key for payment authentication and unlocking/locking any sort of lock, including car doors and house doors. U.S. Pat. No. 9,751,497 issued to Sanji et al. relates to a vehicle control apparatus that wirelessly communicates with a portable communication terminal to execute various actions of a vehicle. International Publication Number WO2017137549A1 titled Wireless Control Token relates to a wireless control token with a wireless transmitter for a remote entry key for a vehicle. U.S. Pat. No. 9,685,012 issued to Saeedi et al. relates to an access management platform for users to manage access to a shared resource such as physical property (e.g., house, office, etc.) based upon biometric data. International Publication Number WO2012061609A1 is directed toward an electronic vehicle security key.

All aforementioned patents and publications are incorporated herein by reference. Also incorporated by reference are U.S. Pat. Nos. 6,140,939; 6,819,219; 6,992,562; 7,185,198; 9,530,265; and U.S. Patent Application Publication Nos. 2006/0097844; and 2014/0292479.

While these devices may be suitable for the particular purpose employed, they would not be as suitable for the purposes of the present invention as disclosed hereafter.

While the prior art discloses various methods of accessing locked vehicles, the present invention implements the use of biometrics with regards to user-authentication to efficiently authenticate a user's request from their smartphone (rather than a passcode, password, QR code, barcode, etc.). This is advantageous because biometric authentication is usually faster and more secure than other methods.

SUMMARY OF THE INVENTION

It is one prospect of the present invention to provide a novel system and method for using an NFC enabled device's biometric authentication for sending an NFC digital key to automotive door module to control the central locking system of the automobile.

The following presents a simplified summary of the present disclosure in a simplified form as a prelude to the more detailed description that is presented herein.

Therefore, in accordance with the present invention, there is provided a method for automatically unlocking a vehicle, comprising installing an authentication module within a door of the vehicle. The authentication module may comprise a microcontroller board with NFC capabilities and a relay shield configured to send a signal to a central locking system of the vehicle. The authentication module may be adapted to wirelessly connect to a personal data device that is configured for biometric authentication of a user of the device. When the user places a personal data device within NFC communication range of the microcontroller board, the personal data device automatically prompts a biometric authentication mechanism to the verify the identity of a user when the personal data device is in NFC communication with the authentication module. Verifying the identity of the user via biometric authentication while in NFC communication with the personal data device activates the module to send a signal to the central locking system to unlock the vehicle.

In one embodiment, the microcontroller may be an Arduino Leonardo circuit board.

In one embodiment, the relay shield may be connected to a key fob configured to send a wireless signal to the central locking system of the vehicle.

In one embodiment, the relay shield may be configured via wiring to send a signal to a central locking system of a vehicle.

In one embodiment, the relay shield may be configured to send a signal to a key fob of the vehicle via wiring.

In one embodiment, the personal data device may be a cellular phone.

In one embodiment, personal data device may be a smartwatch.

In one embodiment, the biometric authentication may be facial recognition.

In one embodiment, the biometric authentication may be fingerprint recognition.

In a preferred embodiment, the authentication module further comprises a radio frequency transmitter connected to the relay shield. The radio frequency transmitter may be configured to send a signal to unlock the vehicle during the step of verifying the identity of the user via biometric authentication while in NFC communication with the personal data device.

In one embodiment, the authentication module may authenticate the personal data device using a 256-bit alphanumeric key.

In one embodiment, the method may further comprise the step of wirelessly connecting the personal data device to a cloud sever to receive authentication data defining an authentication data time period within which the user is authorized to access the vehicle.

In yet another embodiment, an apparatus for unlocking a door of a body of a vehicle may comprise an authentication module disposed along the body of the vehicle. The authentication module may comprise a microcontroller board with wireless capabilities configured to connect to a personal data device and a relay shield connected to a key fob configured to send a signal to a central locking system of the vehicle for unlocking the vehicle. The authentication module may be adapted to wirelessly connect to the personal data device and the personal data device may be configured for automatic biometric authentication of a user of the personal data device when the personal data device is wirelessly connected to the authentication module. The relay shield may send a said signal to the central locking system upon said automatic biometric authentication.

In one embodiment, the signal sent to the central locking system may be a radio frequency signal.

In one embodiment, the microcontroller board may connect to the personal data device via WiFi.

In one embodiment, the microcontroller board may connect to the personal data device via Bluetooth.

In one embodiment, the microcontroller board may connect to the personal data device via NFC.

In one embodiment, the biometric authentication may be facial recognition.

In one embodiment, the biometric authentication may be fingerprint recognition.

In one embodiment, the microcontroller board may connect to the personal data device via NFC and the biometric authentication may be facial recognition.

In one embodiment, the microcontroller board may connect to the personal data device via NFC and the biometric authentication may be fingerprint recognition.

In one embodiment, authentication module may be connected to an exterior surface of the vehicle.

In one embodiment, the microcontroller board may be connected to the personal data device via NFC, the biometric authentication may be facial recognition, and the authentication module may be connected to an exterior surface of the vehicle.

In one embodiment, the authentication module may be connected to an interior surface of the vehicle.

In one embodiment, the microcontroller board may connect to the personal data device via NFC, the biometric authentication may be facial recognition, and the authentication module may be connected to an interior surface of the vehicle.

In one embodiment, the authentication module may be connected to an exterior surface of the vehicle.

In one embodiment, the microcontroller board may connect to the personal data device via NFC, the biometric authentication may be fingerprint recognition, and the authentication module may be connected to an exterior surface of the vehicle.

In one embodiment, the authentication module may be connected to an interior surface of the vehicle.

In one embodiment, the microcontroller board may connect to the personal data device via NFC, the biometric authentication may be fingerprint recognition, and the authentication module may be connected to an interior surface of the vehicle.

In yet another embodiment, an apparatus for unlocking a vehicle may comprise an authentication module located within a door of the vehicle. The authentication module may comprise a microcontroller board with NFC capabilities and a relay shield configured to send a radio frequency signal to a central locking system of the vehicle to unlock the vehicle. The authentication module may be adapted to wirelessly connect to a personal data device when in NFC range. The personal data device may be configured for automatic biometric authentication of a user of the personal data device when the personal device is connected to the authentication module, which activates the module to send a signal to the central locking system to unlock the vehicle.

In one embodiment, the radio frequency signal may be sent to the central locking system via a key fob.

BRIEF DESCRIPTION OF THE DRAWINGS

Illustrative embodiments of the present invention are described herein with reference to the accompanying drawings, in which.

DETAILED DESCRIPTION

For a further understanding of the nature and function of the embodiments, reference should be made to the following detailed description. Detailed descriptions of the embodiments are provided herein, as well as, the best mode of carrying out and employing the present invention. It will be readily appreciated that the embodiments are well adapted to carry out and obtain the ends and features mentioned as well as those inherent herein. It is to be understood, however, that the present invention may be embodied in various forms. Therefore, persons of ordinary skill in the art will realize that the following disclosure is illustrative only and not in any way limiting, as the specific details disclosed herein provide a basis for the claims and a representative basis for teaching to employ the present invention in virtually any appropriately detailed system, structure or manner. It should be understood that the devices, materials, methods, procedures, and techniques described herein are presently representative of various embodiments. Other embodiments of the disclosure will readily suggest themselves to such skilled persons having the benefit of this disclosure.

Referring initially to FIGS. 1-4, the basic constructional details and principles of operation of the System for Using an NFC Enabled Smartphone's Biometric Authentication for Sending NFC Digital Key to Automotive Door Module to Control Central Locking System 100 according to a preferred embodiment of the present invention will be discussed.

Figure 1:
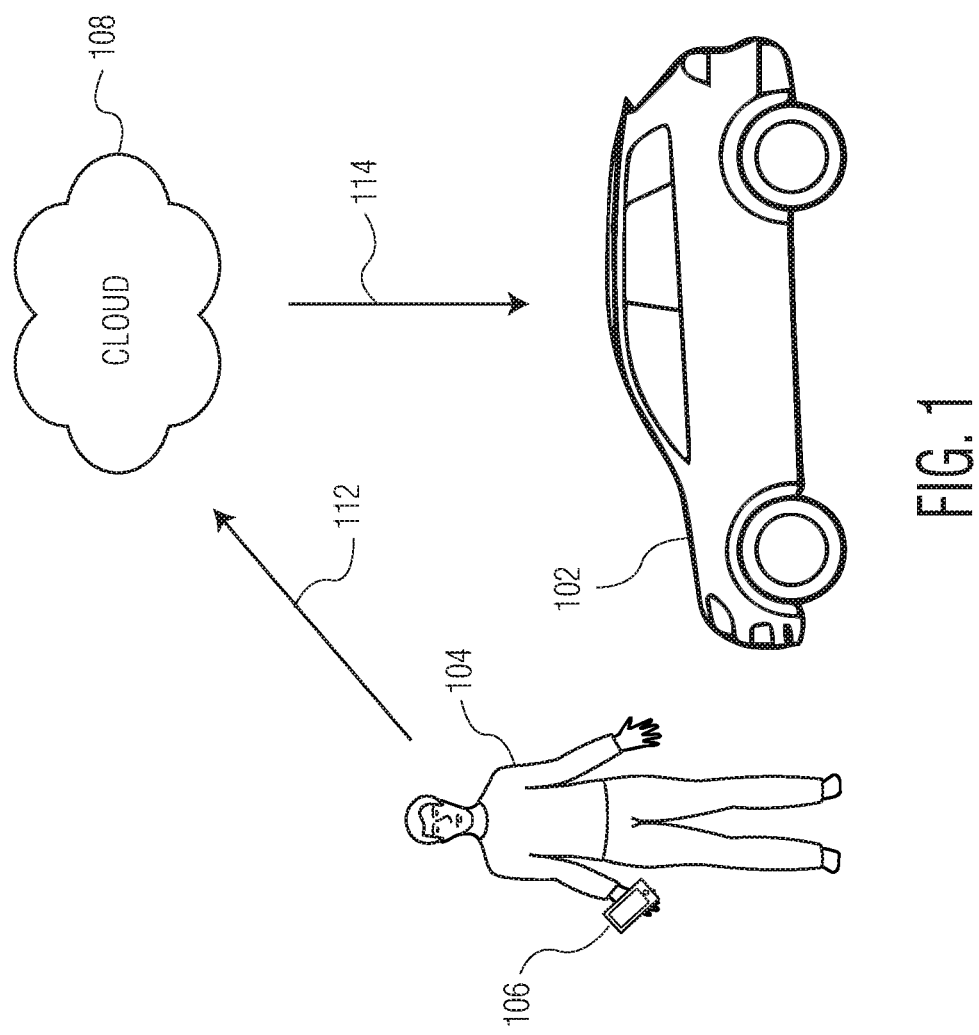
FIG. 1 is a plan view of a prior art system of unlocking an automobile with a wireless phone.

FIG. 1 shows a conventional method of unlocking an automobile. Applications of these methods are used by Car2Go, Enterprise Car Sharing, Reach Now, and others. An automobile 102 is desired to be rented by user 104. The user 104 accesses the cloud 108 via the user's smartphone 106 by sending request 112 via a cellular data or Wi-Fi connection. Cloud 108 receives the request from the user 104. If the credentials match the reservation or other data used by the user 104 to reserve the automobile 102, the cloud 108 will send a signal 114 via a cellular or Wi-Fi network to a module within the automobile 102 to allow for unlocking via unlocking mechanism 110. This signal may unlock a lockbox containing the keys to the automobile or unlock the automobile itself. As will be explained in further detail below, there are several disadvantages to the conventional method illustrated in FIG. 1 that embodiments of the present invention seeks to resolve.

Figure 2:
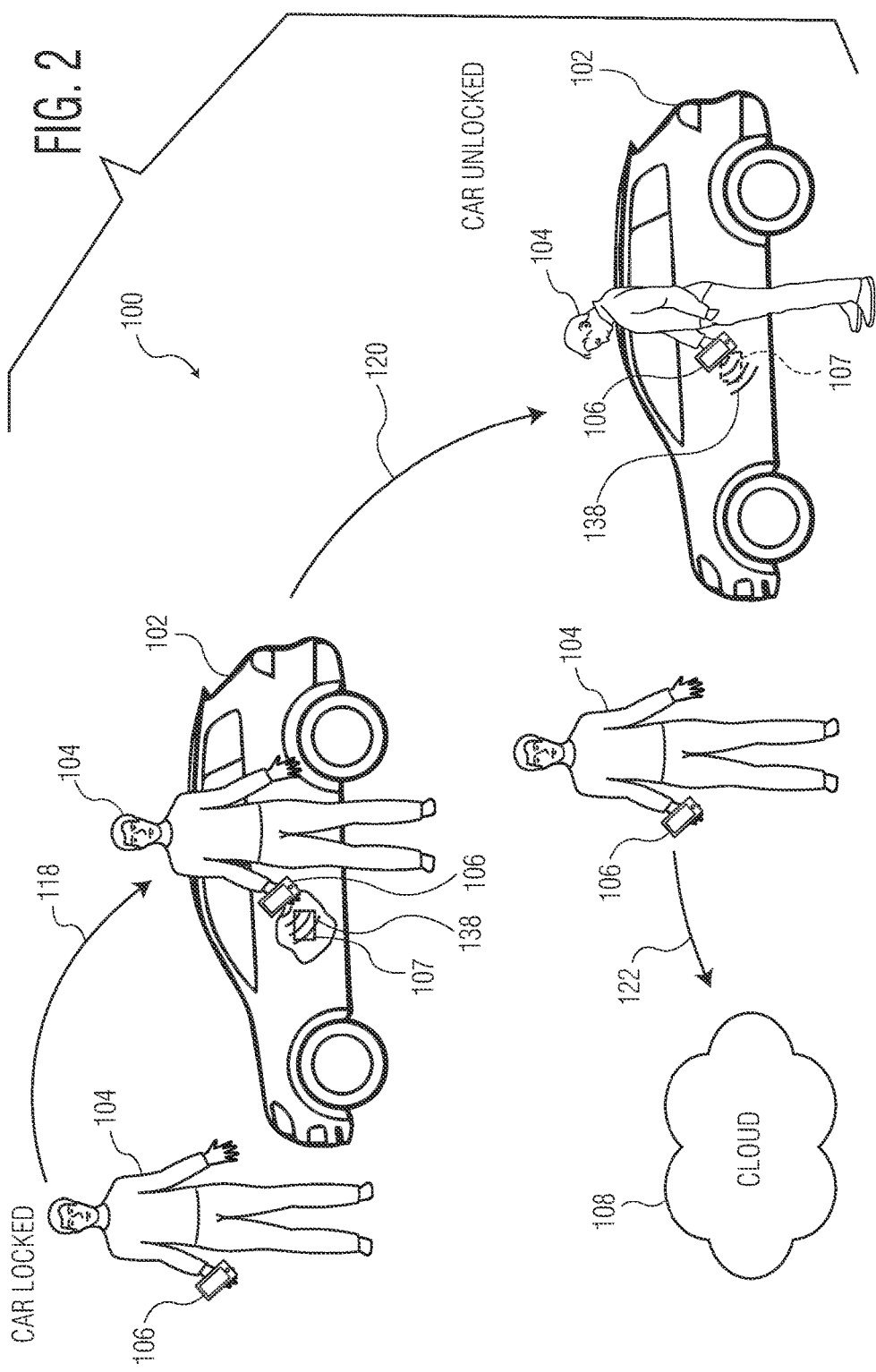
FIG. 2 is a plan view of a system of unlocking an automobile using biometrics.

FIG. 2 shows a preferred embodiment of the present invention, the system 100. A user 104 may approach a locked automobile 102 that the user desires to rent. In step 118, the user 104, may initiate a connection, such as by NFC connectivity 138, with a module 107 within automobile 102 via mobile device 106. In light of the disclosure herein, a person having the ordinary skill in the art would appreciate that mobile device 106 may be a smart phone, a smart watch, a fitness tracker, a tablet computer, or any mobile device with internet connectivity that can be configured to receive and verify a user's identity, either through biometric data or password protection. In accordance with embodiments of the invention, a user 104 may initiate a wireless connection 138 with the automobile 102 by accessing the mobile device 106 via biometric permissions. In some embodiments, for example, a mobile application located on the mobile device 106 may use facial recognition technology or a finger print sensor to verify the identity of user 104 for biometric authentication in accordance with embodiments herein. In some embodiments, additional layers of security may also be used in conjunction with the biometrics to ensure a two-step verification method such as a 256-bit alphanumeric key, for example. In one embodiment, a password may be used in conjunction with or in lieu of biometrics. If the mobile device 106 is unable to verify a user's identity through biometrics, the mobile device 106 may still allow a user to access the automobile 102 after password verification, for example. Certain embodiments may require a two-step password authentication. Once the user 104 has successfully connected 138 to the automobile 102, step 240 ensures that the biometrics and any other security information are valid, and the credentials match the most recent server fetch, the car 102 will be unlocked. In a preferred embodiment, in step 122, the cloud server preferably records a time stamp or timecode; and if an error occurs, the user, app, car (module), and customer services are contacted, and action is executed.

This time stamp is the differentiation between a reservation hold and a rental, or usage, period. This proves fundamental to not only the personal car ownership model but also to future autonomous car-sharing/ride-sharing models where cars 102 will drive up to users 104 and users 104 will have to walk up and need some unlocking and verification apparatus. This time stamp will record in the cloud to confirm receipt of such autonomous vehicle. For example, through embodiments disclosed herein, when a car 102 is unlocked, that means the car 102 is in the possession of the user 104. Otherwise, the car 102 not being unlocked means it is not in possession of a user 104.

Unlike conventional methods, the system 100 of the present invention allows the vehicle to store verification data onboard without need for cloud verification of a user's 104 credentials. By removing cloud verification from step 118, a user 104 can more securely and efficiently rent a car 102 without having to wait for a response from the cloud 108. For example, the system 100 may be configured to unlock a vehicle 102 when it receives a particular piece of information, such as a 256-bit alphanumeric key. The mobile phone application on smartphone 106 may receive the 256-bit alphanumeric key from the cloud server 108 when a user is authorized to access the vehicle 102. This will be communicated from the smartphone 106 to the system 100 via NFC communication device 136. When the user 104 is not authorized to access the vehicle 102, the cloud may, for example, remove the 256-bit alphanumeric key from the user's smartphone 106. In the absence of this 256-bit alphanumeric key, the system 100 will not unlock, even when the identity of the user 104 has been verified via biometrics and the smartphone 106 is in NFC communication with the automobile 102.

In a preferred embodiment, communication will be between the cloud 108 and the user's smartphone 106, eliminating the need for the automobile 102 to communicate with the cloud 108. For example, the process may fetch every hour, with an optional server push if in an error, such as a billing error, or another issue occurs, or a driving record comes to the attention of the office. The smartphone 106 may connect to the cloud 108 to inquire as to the status as of that time. With each fetch, such as an hourly fetch, the smartphone 106 will ask the servers if the user 104 and their account is authorized: if it is then there will be nothing apparent to the user 104; however, if it the user 104 is not authorized then it will send a notification to the user 104 via the app on the smartphone 106 alerting to the error and an error message. An advantage of including an optional push notification allows a company to decide if it can make strong programs on their servers to keep searching for errors and then send a signal to the app and to deny use from thereon out. This information can be stored in the servers or on the user's phone/app. The data pertains to authentication to use the car so payment, driving record, or even further law enforcement intervention.

Figure 3:
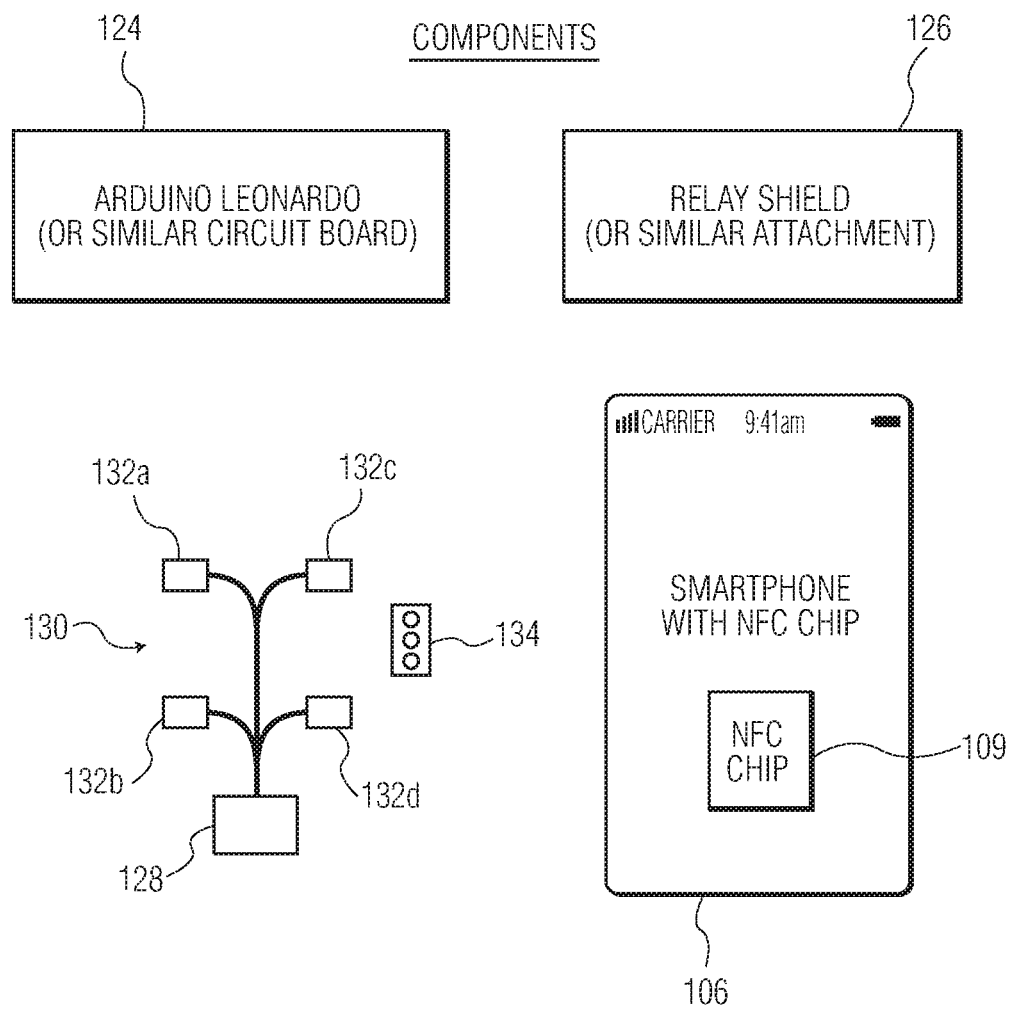
FIG. 3 is a plan view of components of a system of unlocking an automobile using biometrics.
Figure 4:
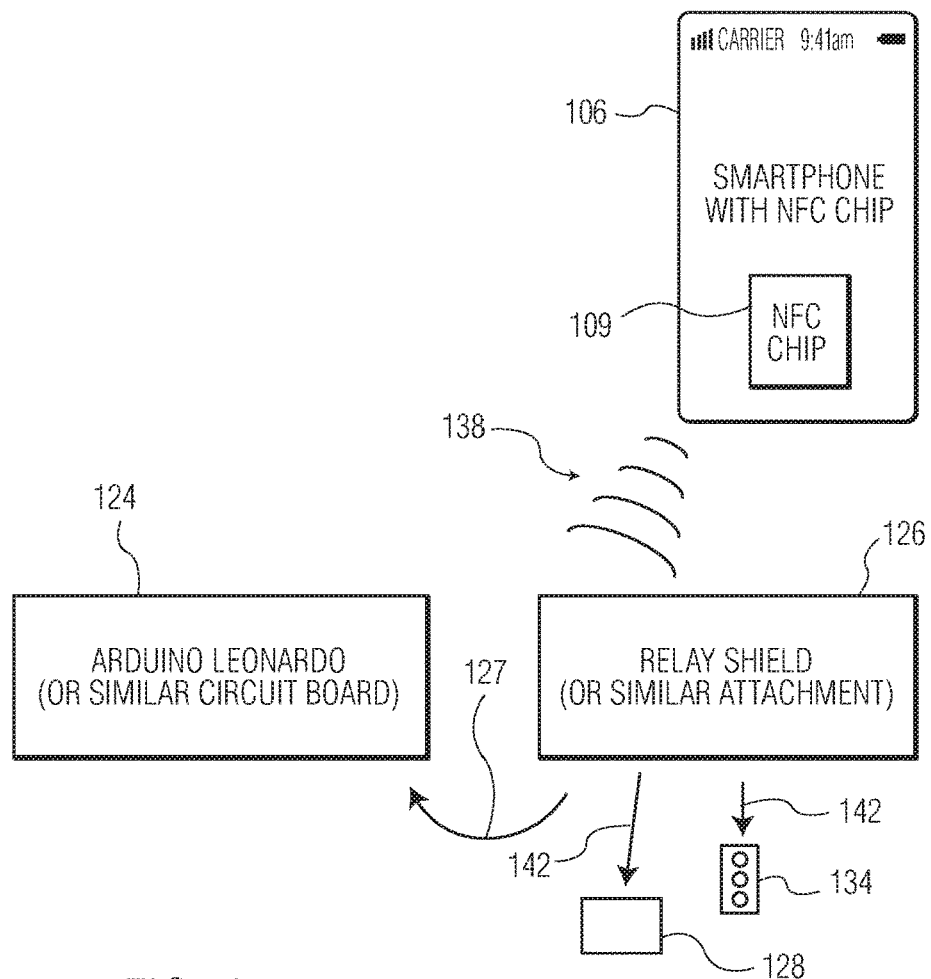
FIG. 4 is a is a plan view of components of a system of unlocking an automobile using biometrics.

FIGS. 3 and 4 show the components of the module 107 of a preferred embodiment of the present invention. Referring to FIG. 4, a mobile device 106 may establish a connection via NFC chip 109, for example, with a relay shield 126 via a wireless NFC receiver 136. The relay shield 126 may be a KeyDuino, for example. A person having the ordinary skill in the art will appreciate any suitable form of wireless communication may be established between mobile device 106 and relay shield 126. In certain embodiments, a touch sensor may be used to facilitate a connection. Module 107 may contain an Arduino Leonard circuit board 124, for example.

Figure 5:
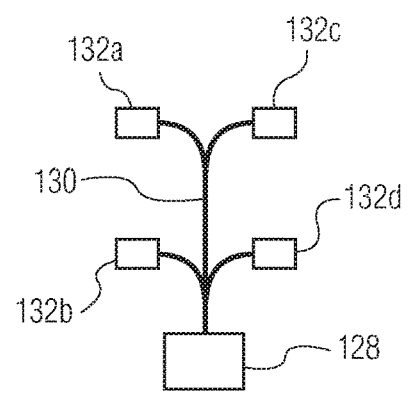
FIG. 5 is a plan view of the central locking system and actuators of an automobile.
Figure 15:
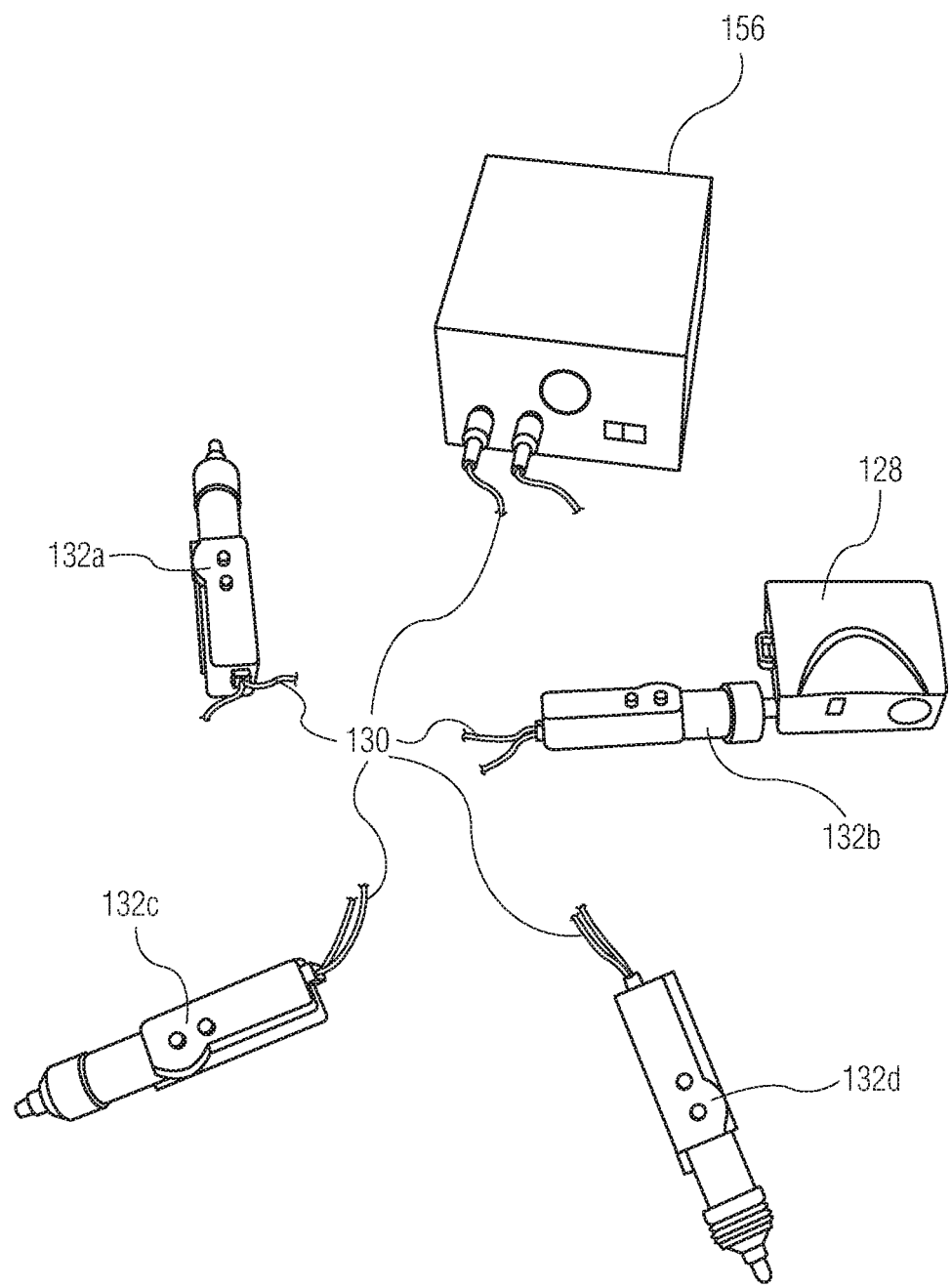
FIG. 15 is a top view of the central locking system of an automobile.

FIGS. 5 and 15 show the main circuit board 128 of the central locking system connected to actuators 132a-d via wiring harness 130. The actuators 132a-d may be configured to mechanically lock and unlock each door of the automobile 102 upon receiving a command from the central locking system. While the embodiment shown in FIG. 5 is configured for an automobile with four doors, embodiments for other vehicles, such as two, three, or five door vehicles, may require two three, or five actuators, respectively.

Figure 6:
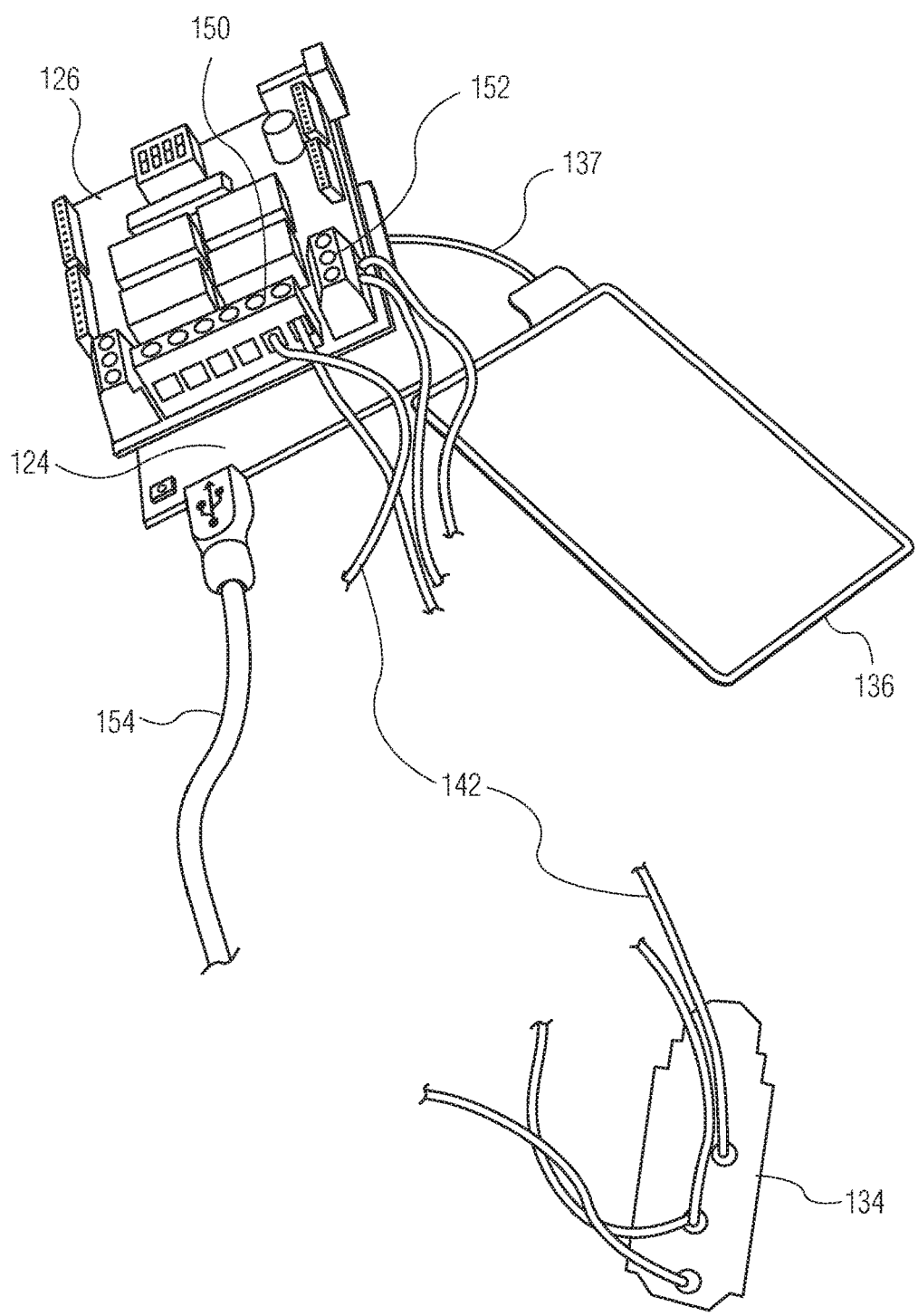
FIG. 6 is a perspective view of a system of unlocking an automobile using biometrics.
Figure 7:
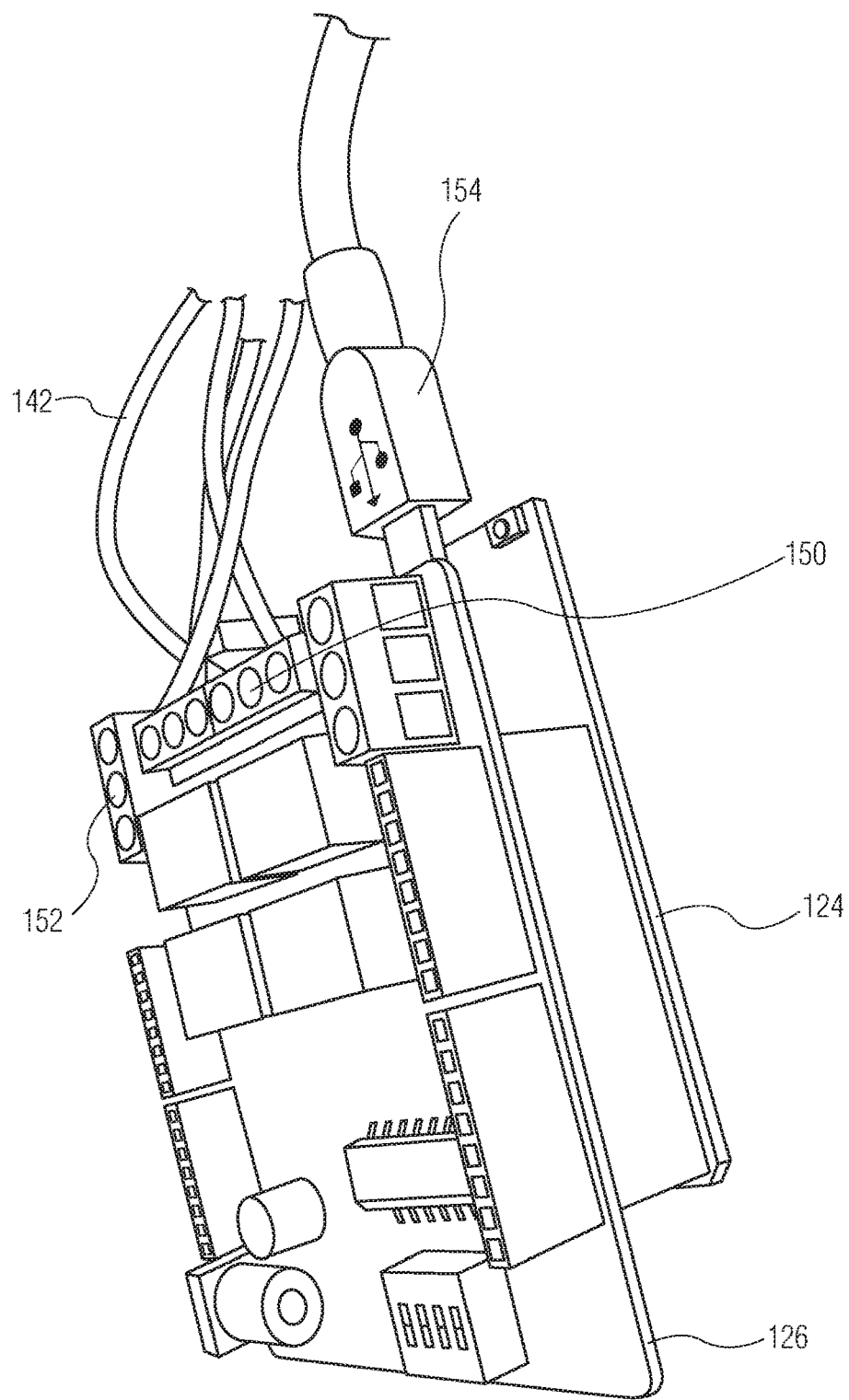
FIG. 7 is a perspective view of a system of unlocking an automobile using biometrics.
Figure 8:
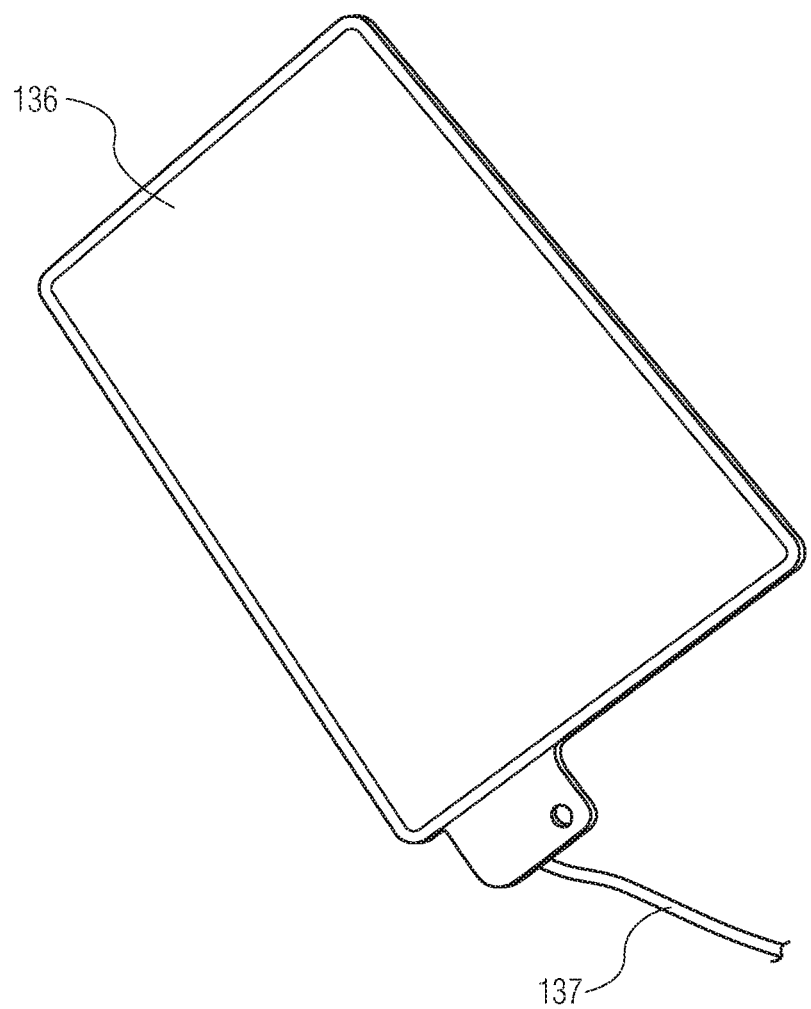
FIG. 8 is a top view of an NFC enabled device.

FIGS. 6 and 7 show a preferred embodiment of the present invention. An Arduino Leonard circuit board 124 micro controller is preferably used as the processor for the system. Using an Arduino Leonard circuit board 124 provides advantages over conventional systems because it is open-source and thus easy to program and configure, allowing the owner of the automobile 102 to configure it either with the central locking system 128 or a key fob 134. NFC receiver 136 may be connected to the circuit board 124 via wiring 137. The relay shield 126 may include relay terminals 150 and 152. After the smartphone 106 has initiated NFC communication (e.g. 138) with the automobile 102 and verified the identity of the user 104, an electrical signal will be sent to unlock the automobile 102. To unlock the automobile 102, an electrical signal is sent via the relay terminals 150 and 152 to close the circuit of either the key fob 134 or the central locking system 128, depending on the specific configuration in the automobile 102. In general, a key fob 134 or a central locking system 128 will activate actuators 132a-d upon having their circuits closed, thereby opening the locks of the automobile 102. An advantage of the relay shield 126 is the availability of multiple ports within relay terminals 150 and 152. In some embodiments, both the central locking system 128 and key fob 134 may be connected to the relay shield 126.

Figure 9:
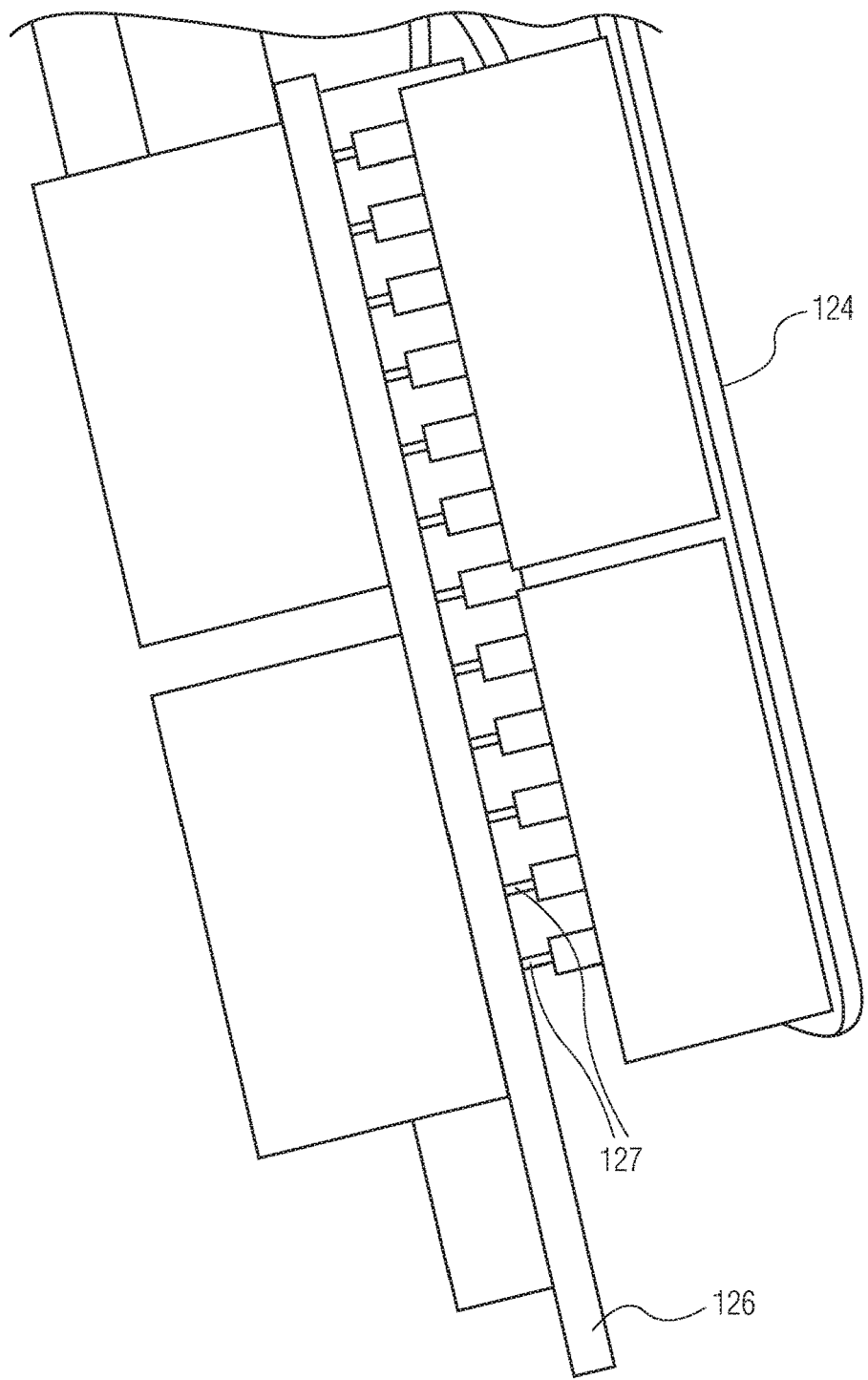
FIG. 9 is a side view of a system of unlocking an automobile using biometrics.
Figure 10:
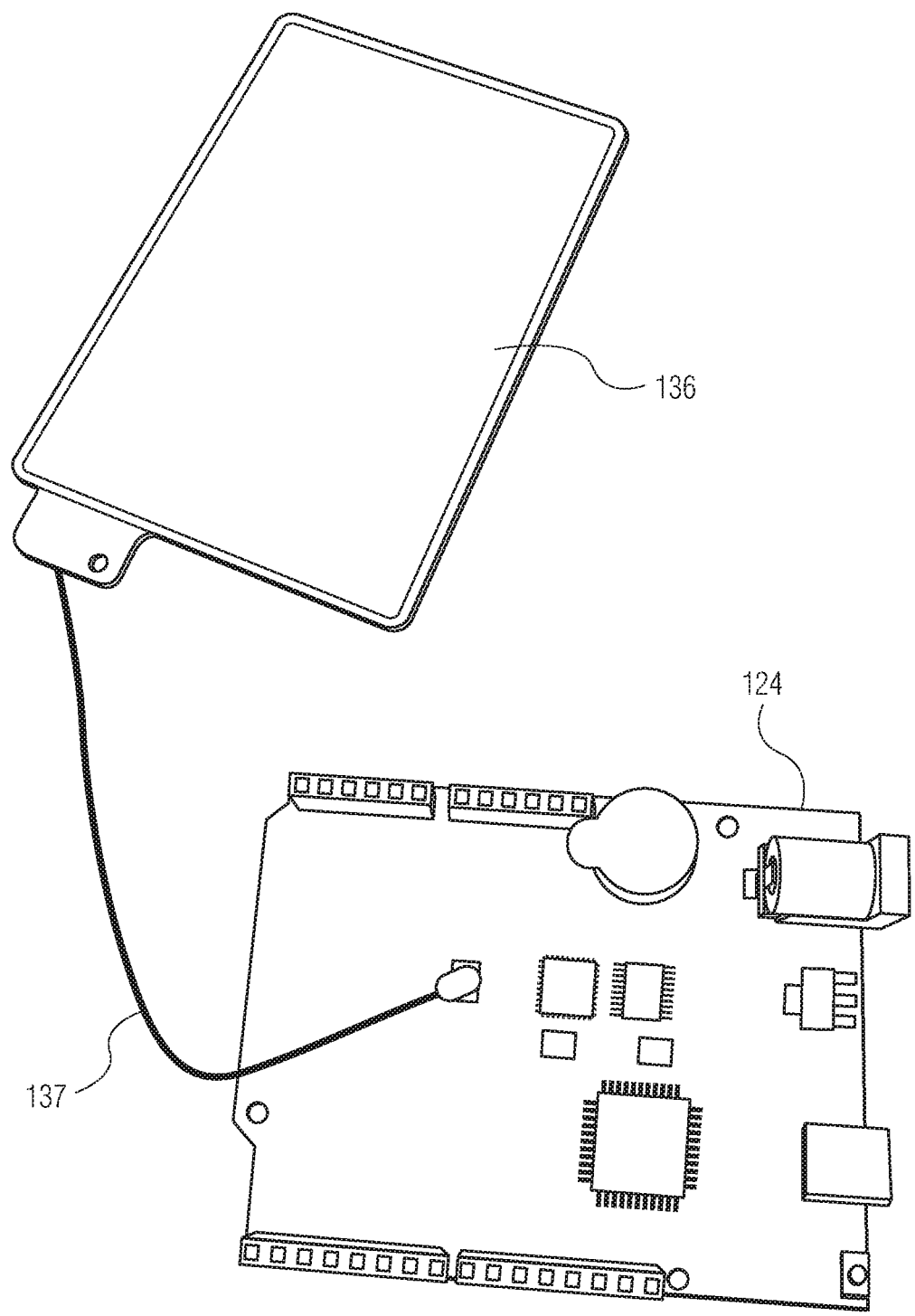
FIG. 10 is a top view of an NFC enabled device connected to a logic board.
Figure 11:
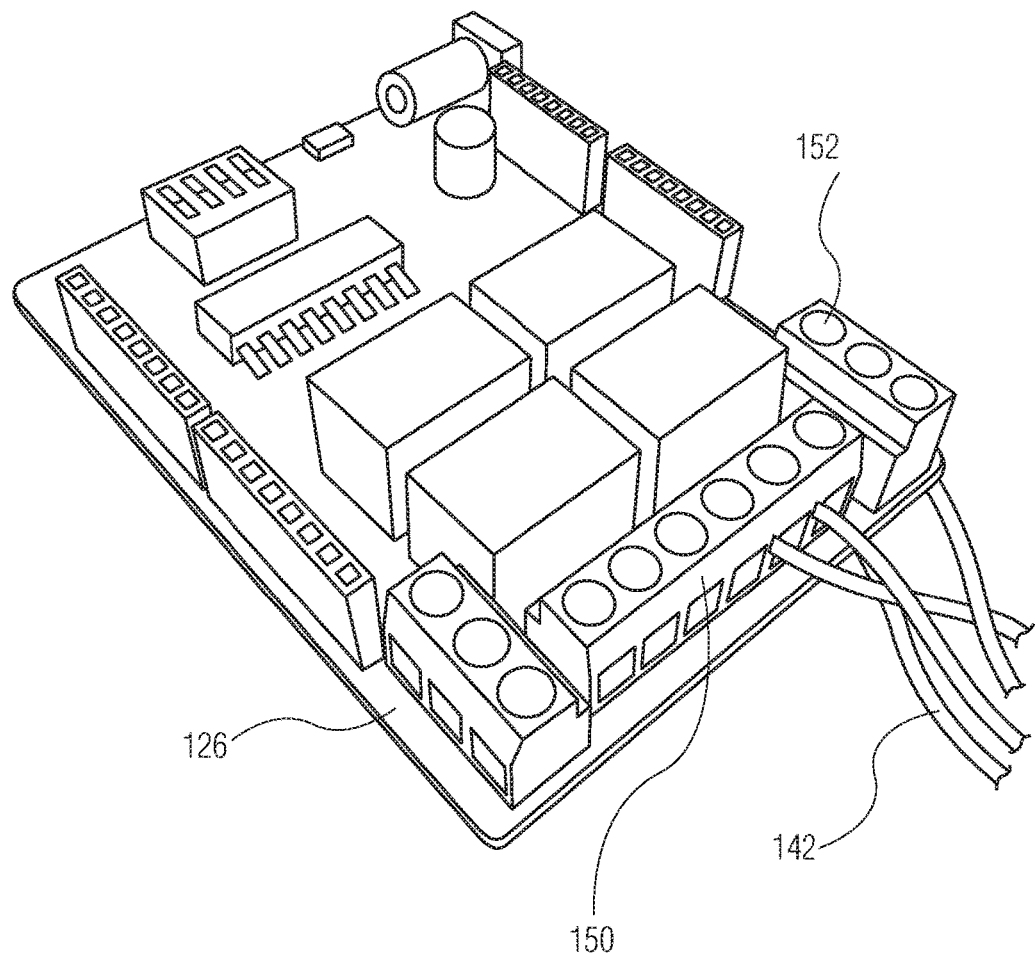
FIG. 11 is a perspective view of a relay shield.
Figure 12:
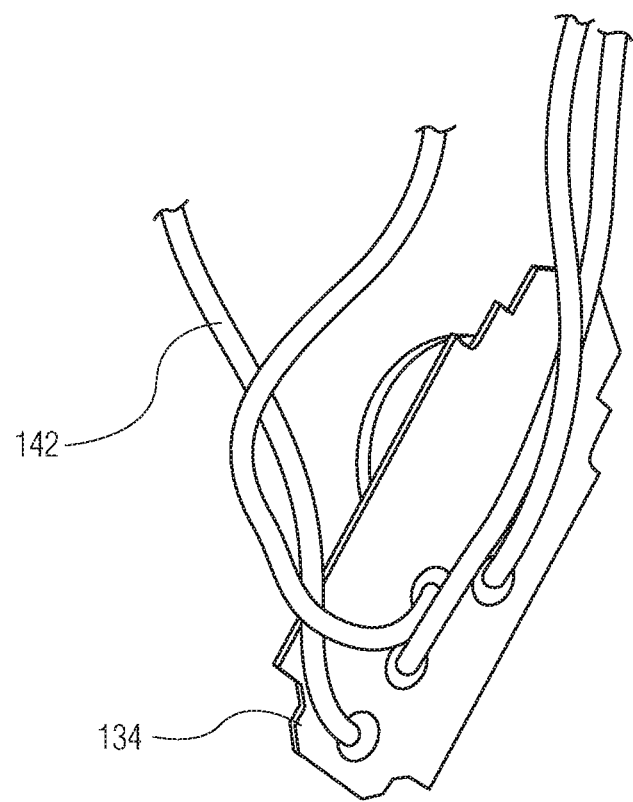
FIG. 12 is a perspective view of a key fob and wiring to connect to a system of unlocking an automobile using biometrics.
Figure 13:
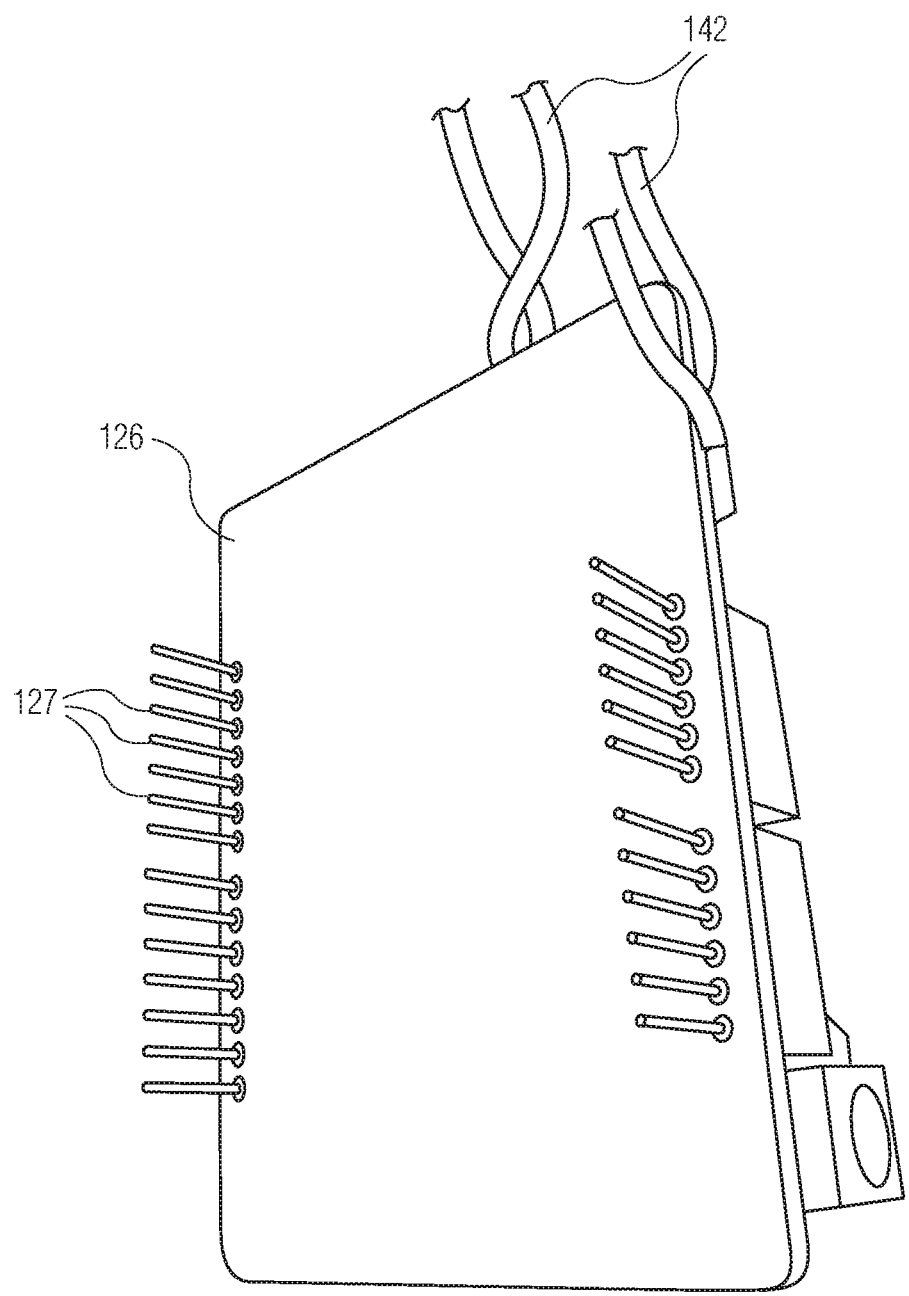
FIG. 13 is a perspective view of the underside of a relay shield.
Figure 14:
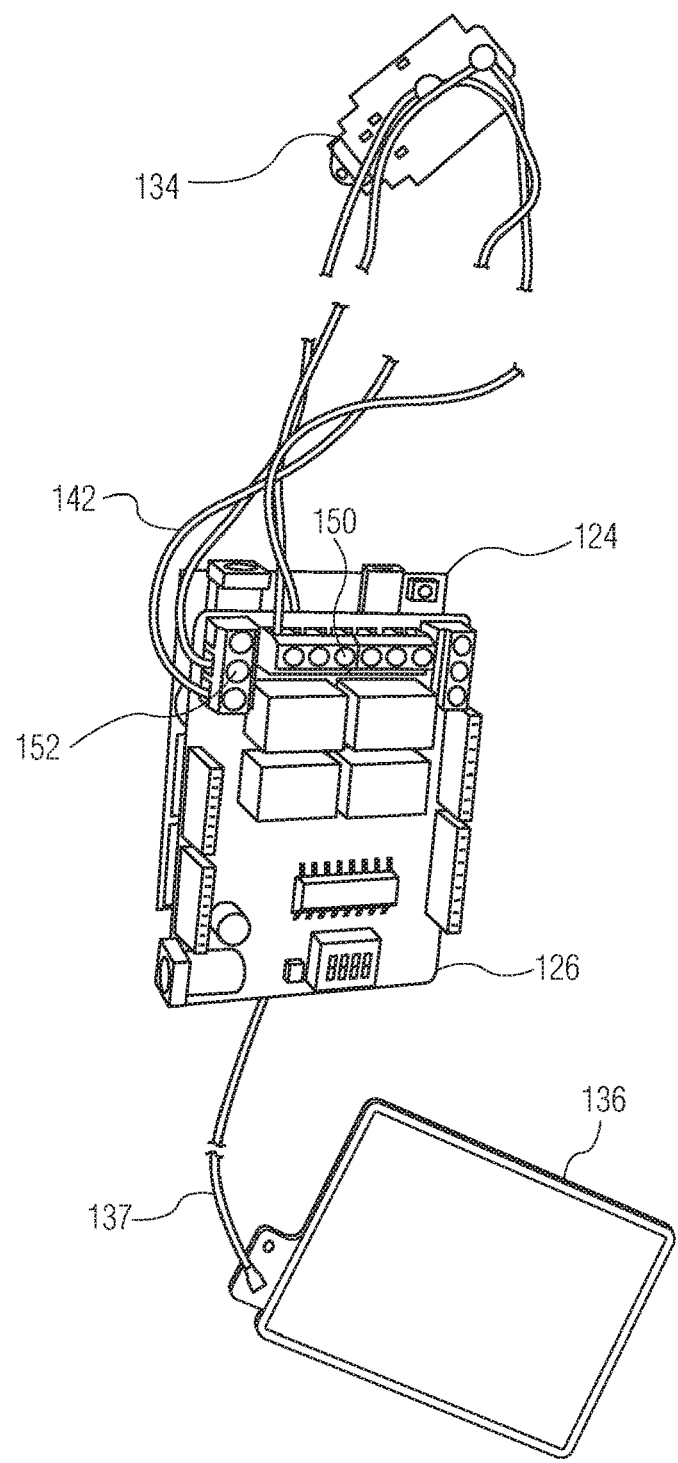
FIG. 14 is a plan view of a system of unlocking an automobile using biometrics.

In one embodiment, the relay shield 126 is preferably connected to the Arduino Leonardo circuit board 124 via a pin connection 127, as illustrated in FIGS. 9 and 13. In some embodiments, the relay shield 126 may be configured via wiring 142 to the central locking mechanism 128 of the automobile 102. The wiring 142 between the relay shield 126 and the locking mechanism of the automobile allows the remote key fob 134 of the automobile 102 to be in communication with the system 100. Alternatively, the relay shield 126 may be connected to the central locking system 128 via wiring 142. A power source 156, such as the electrical system of the vehicle 102, may power the central locking system 128. FIGS. 8-15 show various exploded views of the components of exemplary embodiments of the invention.

In an exemplary operation, the system 100 uses biometric authentication for the smartphone 106 to trigger sending a signal to an NFC receiver module 136 in the door of an automobile 102 to control the central locking system 128 to lock and unlock the doors. A user 104 places the smartphone 106 against the car door, or within NFC range of the car door, such as, for example, within 20 cm of the module 107 inside the car door. The NFC chip 109 of the smartphone 106 will sense the signal 138 and then automatically display a prompt on the screen of the smartphone 106 for biometric (e.g., facial, fingerprint) recognition of the user 104 while the smartphone 106 is within the NFC range, through embodiments of the invention. The user 104 preferably places his or her face in view of the screen, or a finger on a fingerprint sensor, of the smartphone 106, for example. The smartphone 106 recognizes the biometric data, preferably such as the face of the user 104, triggering unlocking of the doors of the car 102. In rental car applications, the system 100 may initiate a car rental period by sending a signal from the smartphone 106 to the cloud 108, through embodiments of the invention. Amongst the many advantages, one of the advantages of the embodiments disclosed herein is that it enables biometric keyed entry into any car (which contains a door module 107) without need for adding facial recognition hardware being embedded or installed in every car door. For example, if a person installed cameras in every car door, those cameras would be subject to everyday damage. Yet, through embodiments of the invention disclosed herein, if a module 107 is installed inside the car door where it is protected from the elements, then the camera of each user's 104 phone (e.g., 106) could be used for biometric recognition and authentication of the user 104, and the NFC enabled phone 106 would transmit the NFC signal through the door material to the module which is electrically (or alternatively wirelessly) connected to the car's central locking system 144. Embodiments of the invention take advantage of the preexisting infrastructure of the vehicle 102, obviating the need to add camera hardware to the door of a vehicle 102.

Embodiments of the present invention may also be used in applications other than in rental cars. For instance, the customizability of the Arduino Leonardo circuit board allows users to customize their own applications and security settings. For example, individual users 104 may choose to install the module 107 in a personal vehicle 102, allowing for entry via their smartphones rather than the need to carry a key fob. An owner of multiple vehicles 102 may also choose to install the modules in a fleet and selectively allow authorized users 104, such as employees, access. Access could be restricted based on whether an employee 104 is currently working or off duty. Access could be removed upon termination of an employee 104.

Figure 16:
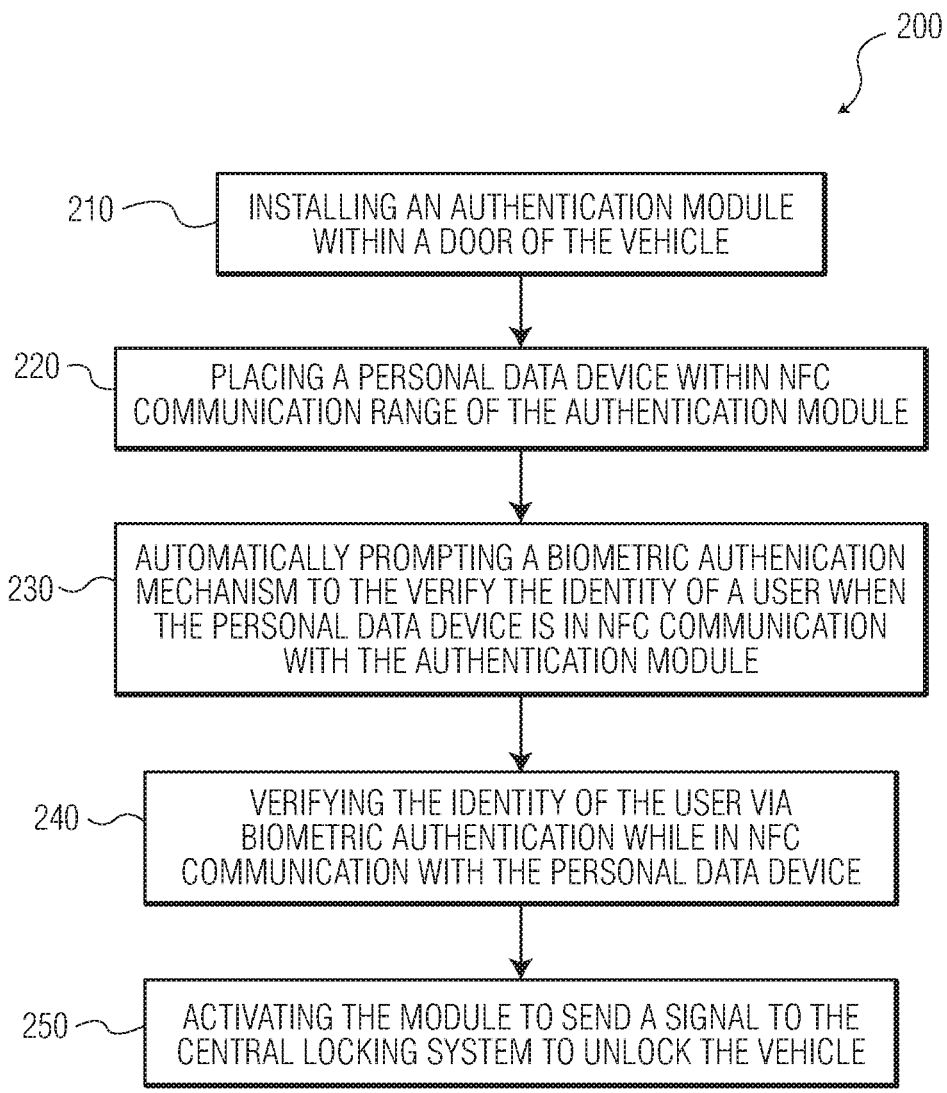
FIG. 16 is an exemplary flowchart illustrating an exemplary method of unlocking a vehicle in accordance with embodiments of the invention.

In accordance with embodiments of the invention, there is provided a method 200 for automatically unlocking a vehicle, comprising the step 210 of installing an authentication module 107 within a door of the vehicle 102, as shown in FIG. 16 and where an exemplary authentication module 107 is illustrated as being disposed within an interior portion of the door of the vehicle 102 in FIG. 2. The authentication module 107 preferably comprises a microcontroller board 124 with NFC capabilities 136 and a relay shield 126 configured to send a signal to a central locking system 144 of the vehicle 102. The authentication module 107 may be adapted to wirelessly connect to a personal data device 106 that is configured for biometric authentication of a user 104 of the device 106. When the user 104 places a personal data device 106 within NFC communication range of the microcontroller board 124 in step 220, the personal data device 106 automatically prompts a biometric authentication mechanism to the verify the identity of a user 104 when the personal data device 106 is in NFC communication with the authentication module 107 in step 230. Verifying the identity of the user 104 via biometric authentication while in NFC communication with the personal data device 106 activates the module 107 in step 240 to send a signal to the central locking system 144 to unlock the vehicle 102 in step 250.

In one embodiment, the microcontroller 124 may be an Arduino Leonardo circuit board.

In one embodiment, the relay shield 126 may be connected to a key fob 134 configured to send a wireless signal to the central locking system 144 of the vehicle 102.

In one embodiment, the relay shield 126 may be configured via wiring 142 to send a signal to a central locking system 144 of a vehicle 102.

In one embodiment, the relay shield 126 may be configured to send a signal to a key fob 134 of the vehicle 102 via wiring 144.

In one embodiment, the personal data device 106 may be a cellular phone.

In one embodiment, personal data device 106 may be a smartwatch.

In one embodiment, the biometric authentication may be facial recognition. In another embodiment, the biometric authentication may be fingerprint recognition.

In a preferred embodiment, the authentication module 107 further comprises a radio frequency transmitter connected to the relay shield 126. The radio frequency transmitter may be configured to send a signal to unlock the vehicle 102 during the step 240 of verifying the identity of the user 104 via biometric authentication while in NFC communication with the personal data device 106.

In one embodiment, the authentication module 107 may authenticate the personal data device 106 using a 256-bit alphanumeric key.

In one embodiment, the method may further comprise the step of wirelessly connecting the personal data device 106 to a cloud sever 108 to receive authentication data defining an authentication data time period within which the user 104 is authorized to access the vehicle 102.

In yet another embodiment, an apparatus 100 for unlocking a door of a body of a vehicle may comprise an authentication module 107 disposed along the body of the vehicle 102. The authentication module 107 may comprise a microcontroller board 124 with wireless capabilities configured to connect to a personal data device 106 and a relay shield 126 connected to a key fob 134 configured to send a signal to a central locking system 144 of the vehicle 102 for unlocking the vehicle 102. The authentication module 107 may be adapted to wirelessly connect to the personal data device 106 and the personal data device 106 may be configured for automatic biometric authentication of a user 104 of the personal data device 106 when the personal data device 106 is wirelessly connected to the authentication module 107. The relay shield 126 may send a said signal to the central locking system 144 upon said automatic biometric authentication.

In one embodiment, the signal sent to the central locking system 144 may be a radio frequency signal.

In one embodiment, the microcontroller board 124 may connect to the personal data device 106 via WiFi.

In one embodiment, the microcontroller board 124 may connect to the personal data device 106 via Bluetooth.

In yet another embodiment, the microcontroller board 124 may connect to the personal data device 106 via NFC.

In one embodiment, the biometric authentication is preferably facial recognition.

In yet another embodiment, the biometric authentication may be fingerprint recognition.

In one embodiment, the microcontroller board 124 may connect to the personal data device 106 via NFC and the biometric authentication may be facial recognition. In yet another embodiment, the microcontroller board 124 may connect to the personal data device 106 via NFC and the biometric authentication may be fingerprint recognition.

In one embodiment, an authentication module 107 may be connected to an exterior surface of the vehicle 102.

In one embodiment, the microcontroller board 124 is preferably connected to the personal data device 106 via NFC, the biometric authentication is preferably facial recognition, and the authentication module 107 is connected to an exterior surface of the vehicle 102.

In one embodiment, the authentication module 107 may be connected to an interior surface of the vehicle 102.

In a preferred embodiment, the microcontroller board 124 is preferably connected to the personal data device 106 via NFC, the biometric authentication is preferably facial recognition, and the authentication module 107 is preferably connected to an interior surface of the vehicle 102, where it is protected from weather and other exterior environmental elements.

In one embodiment, the microcontroller board 124 may connect to the personal data device 106 via NFC, the biometric authentication may be fingerprint recognition, and the authentication module 107 may be connected to an exterior surface of the vehicle 102.

In one embodiment, the microcontroller board 124 may connect to the personal data device 106 via NFC, the biometric authentication is fingerprint recognition, and the authentication module 107 is connected to an interior surface of the vehicle 102.

In yet another embodiment, an apparatus for unlocking a vehicle 102 may comprise an authentication module located 107 within a door of the vehicle 102. The authentication module 107 may comprise a microcontroller board 124 with NFC capabilities and a relay shield 126 configured to send a radio frequency signal to a central locking system 144 of the vehicle 102 to unlock the vehicle 102. The authentication module 107 may be adapted to wirelessly connect to a personal data device 106 when in NFC range. The personal data device 106 may be configured for automatic biometric authentication of a user of the personal data device 106 when the personal device 106 is connected to the authentication module 107, which activates the module to send a signal to the central locking system 144 to unlock the vehicle 102.

In one embodiment, the radio frequency signal may be sent to the central locking system 144 via a key fob 134.

This invention is susceptible to considerable variation within the spirit and scope of the appended claims.

The claimed invention is:

1. A method for automatically unlocking a vehicle, comprising:
installing an authentication module within a door of the vehicle, wherein said authentication module comprises:
a microcontroller board with near-field communication (NFC) capabilities;
a relay shield configured to send a signal to a central locking system of the vehicle;
a radio frequency transmitter connected to the relay shield, wherein the radio frequency transmitter is configured to send a signal to unlock the vehicle;
wherein the authentication module is adapted to wirelessly connect to a personal data device; and
wherein the personal data device is configured for biometric authentication of a user of the device;
placing a personal data device within NFC communication range of the microcontroller board;
wherein the personal data device automatically prompts a biometric authentication mechanism to verify the identity of a user when the personal data device is in NFC communication with the authentication module; and
verifying the identity of the user via biometric authentication while in NFC communication with the personal data device, which activates the module to send a signal to the central locking system to unlock the vehicle.

2. The method of claim 1, wherein the microcontroller is an Arduino Leonardo circuit board.

3. The method of claim 1, wherein the relay shield is connected to a key fob configured to send a wireless signal to the central locking system of the vehicle.

4. The method of claim 1, wherein the relay shield is configured via wiring to send a signal to a central locking system of a vehicle.

5. The method of claim 1, wherein the relay shield is configured to send a signal to a key fob of the vehicle via wiring.

6. The method of claim 1, wherein the personal data device is a cellular phone.

7. The method of claim 1, wherein the personal data device is a smartwatch.

8. The method of claim 1, wherein the biometric authentication is facial recognition.

9. The method of claim 1, wherein the biometric authentication is fingerprint recognition.

10. The method of claim 1, wherein the authentication module authenticates the personal data device using a 256-bit alphanumeric key.

11. The method of claim 1, further comprising the step of wirelessly connecting the personal data device to a cloud sever to receive authentication data defining an authentication data time period within which the user is authorized to access the vehicle.

12. An apparatus for unlocking a door of a body of a vehicle, comprising:
an authentication module disposed along the body of the vehicle, wherein said authentication module comprises:
a microcontroller board with wireless capabilities configured to connect to a personal data device;
a relay shield connected to a key fob configured to send a signal to a central locking system of the vehicle for unlocking the vehicle; and
a radio frequency transmitter connected to the relay shield, wherein the radio frequency transmitter is configured to send a signal to unlock the vehicle;
wherein the authentication module is adapted to wirelessly connect to the personal data device; and
wherein the personal data device is configured for automatic biometric authentication of a user of the personal data device when the personal data device is wirelessly connected to the authentication module, wherein said relay shield sends said signal to the central locking system upon said automatic biometric authentication.

13. The apparatus of claim 12, wherein the signal sent to the central locking system is a radio frequency signal.

14. The apparatus of claim 12, wherein the microcontroller board connects to the personal data device via a wireless local area network (WiFi).

15. The apparatus of claim 12, wherein the microcontroller board connects to the personal data device via Bluetooth.

16. The apparatus of claim 12, wherein the microcontroller board connects to the personal data device via near-field communication (NFC).

17. The apparatus of claim 16, wherein the biometric authentication is facial recognition.

18. The apparatus of claim 17, wherein authentication module is connected to an exterior surface of the vehicle.

19. The apparatus of claim 17, wherein authentication module is connected to an interior surface of the vehicle.

20. The apparatus of claim 16, wherein the biometric authentication is fingerprint recognition.

21. The apparatus of claim 20, wherein authentication module is connected to an exterior surface of the vehicle.

22. The apparatus of claim 20, wherein authentication module is connected to an interior surface of the vehicle.

23. The apparatus of claim 12, wherein the biometric authentication is facial recognition.

24. The apparatus of claim 23, wherein authentication module is connected to an exterior surface of the vehicle.

25. The apparatus of claim 23, wherein authentication module is connected to an interior surface of the vehicle.

26. The apparatus of claim 12, wherein the biometric authentication is fingerprint recognition.

27. The apparatus of claim 12, wherein authentication module is connected to an exterior surface of the vehicle.

28. The apparatus of claim 12, wherein authentication module is connected to an interior surface of the vehicle.

29. An apparatus for unlocking a vehicle, comprising:
an authentication module located within a door of the vehicle, wherein said authentication module comprises:
a microcontroller board with near-field communication (NFC) capabilities;
a relay shield configured to send a radio frequency signal to a central locking system of the vehicle to unlock the vehicle; and
a radio frequency transmitter connected to the relay shield, wherein the radio frequency transmitter is configured to send a signal to unlock the vehicle;
wherein the authentication module is adapted to wirelessly connect to a personal data device when in NFC range,
wherein the personal data device is configured for automatic biometric authentication of a user of the personal data device when the personal device is connected to the authentication module, which activates the module to send a signal to the central locking system to unlock the vehicle.

30. The apparatus of claim 29, wherein the radio frequency signal is sent to the central locking system via a key fob.

31. A method for automatically unlocking a vehicle, comprising:
  installing an authentication module within a door of the vehicle, wherein said authentication module comprises:
    a microcontroller board with near-field communication (NFC) capabilities;
    a relay shield configured to send a signal to a central locking system of the vehicle, wherein the relay shield is configured to send a signal to a key fob of the vehicle via wiring;
    wherein the authentication module is adapted to wirelessly connect to a personal data device; and
    wherein the personal data device is configured for biometric authentication of a user of the device;
  placing a personal data device within NFC communication range of the microcontroller board;
  wherein the personal data device automatically prompts a biometric authentication mechanism to verify the identity of a user when the personal data device is in NFC communication with the authentication module; and
  verifying the identity of the user via biometric authentication while in NFC communication with the personal data device, which activates the module to send a signal to the central locking system to unlock the vehicle.

32. The method of claim 31, wherein the microcontroller is an Arduino Leonardo circuit board.

33. The method of claim 31, wherein the relay shield is connected to a key fob configured to send a wireless signal to the central locking system of the vehicle.

34. The method of claim 31, wherein the relay shield is configured via wiring to send a signal to a central locking system of a vehicle.

35. The method of claim 31, wherein the personal data device is a cellular phone.

36. The method of claim 31, wherein the personal data device is a smartwatch.

37. The method of claim 31, wherein the biometric authentication is facial recognition.

38. The method of claim 31, wherein the biometric authentication is fingerprint recognition.

39. The method of claim 31, wherein said authentication module further comprises a radio frequency transmitter connected to the relay shield, wherein the radio frequency transmitter is configured to send a signal to unlock the vehicle during the step of verifying the identity of the user via biometric authentication while in NFC communication with the personal data device.

40. The method of claim 31, wherein the authentication module authenticates the personal data device using a 256-bit alphanumeric key.

41. The method of claim 31, further comprising the step of wirelessly connecting the personal data device to a cloud sever to receive authentication data defining an authentication data time period within which the user is authorized to access the vehicle.

42. An apparatus for unlocking a door of a body of a vehicle, comprising:
  an authentication module disposed along the body of the vehicle, wherein said authentication module comprises:
    a microcontroller board with wireless capabilities configured to connect to a personal data device; and
    a relay shield connected to a key fob configured to send a signal to a central locking system of the vehicle for unlocking the vehicle, wherein the relay shield is configured to send the signal to the key fob of the vehicle via wiring;
    wherein the authentication module is adapted to wirelessly connect to the personal data device; and
    wherein the personal data device is configured for automatic biometric authentication of a user of the personal data device when the personal data device is wirelessly connected to the authentication module, wherein said relay shield sends said signal to the central locking system upon said automatic biometric authentication.

43. The apparatus of claim 42, wherein the signal sent to the central locking system is a radio frequency signal.

44. The apparatus of claim 43, wherein the microcontroller board connects to the personal data device via a wireless local area network (WiFi).

45. The apparatus of claim 42, wherein the microcontroller board connects to the personal data device via Bluetooth.

46. The apparatus of claim 42, wherein the microcontroller board connects to the personal data device via near-field communication (NFC).

47. The apparatus of claim 46, wherein the biometric authentication is facial recognition.

48. The apparatus of claim 47, wherein authentication module is connected to an exterior surface of the vehicle.

49. The apparatus of claim 47, wherein authentication module is connected to an interior surface of the vehicle.

50. The apparatus of claim 46, wherein the biometric authentication is fingerprint recognition.

51. The apparatus of claim 50, wherein authentication module is connected to an exterior surface of the vehicle.

52. The apparatus of claim 50, wherein authentication module is connected to an interior surface of the vehicle.

53. The apparatus of claim 42, wherein the biometric authentication is facial recognition.

54. The apparatus of claim 42, wherein the biometric authentication is fingerprint recognition.

55. The apparatus of claim 42, wherein authentication module is connected to an exterior surface of the vehicle.

56. The apparatus of claim 42, wherein authentication module is connected to an interior surface of the vehicle.

57. The apparatus of claim 42, wherein authentication module is connected to an exterior surface of the vehicle.

58. The apparatus of claim 42, wherein authentication module is connected to an interior surface of the vehicle.

59. An apparatus for unlocking a vehicle, comprising:
  an authentication module located within a door of the vehicle, wherein said authentication module comprises:
    a microcontroller board with near-field communication (NFC) capabilities; and
    a relay shield configured to send a radio frequency signal to a central locking system of the vehicle to unlock the vehicle, wherein the relay shield is configured to send a signal to a key fob of the vehicle via wiring;
    wherein the authentication module is adapted to wirelessly connect to a personal data device when in NFC range,
    wherein the personal data device is configured for automatic biometric authentication of a user of the personal data device when the personal device is connected to the authentication module, which activates the module to send a signal to the central locking system to unlock the vehicle.

60. The apparatus of claim 59, wherein the radio frequency signal is sent to the central locking system via a key fob.

* * * * *